(No Model.)  2 Sheets—Sheet 1.

J. STANLEY.
BRIDLE BIT.

No. 317,034. Patented May 5, 1885.

Witnesses:  Inventor:
F. F. Campbell  James Stanley,
Ernest D. Winans.  By Drake & Co
  Attys.

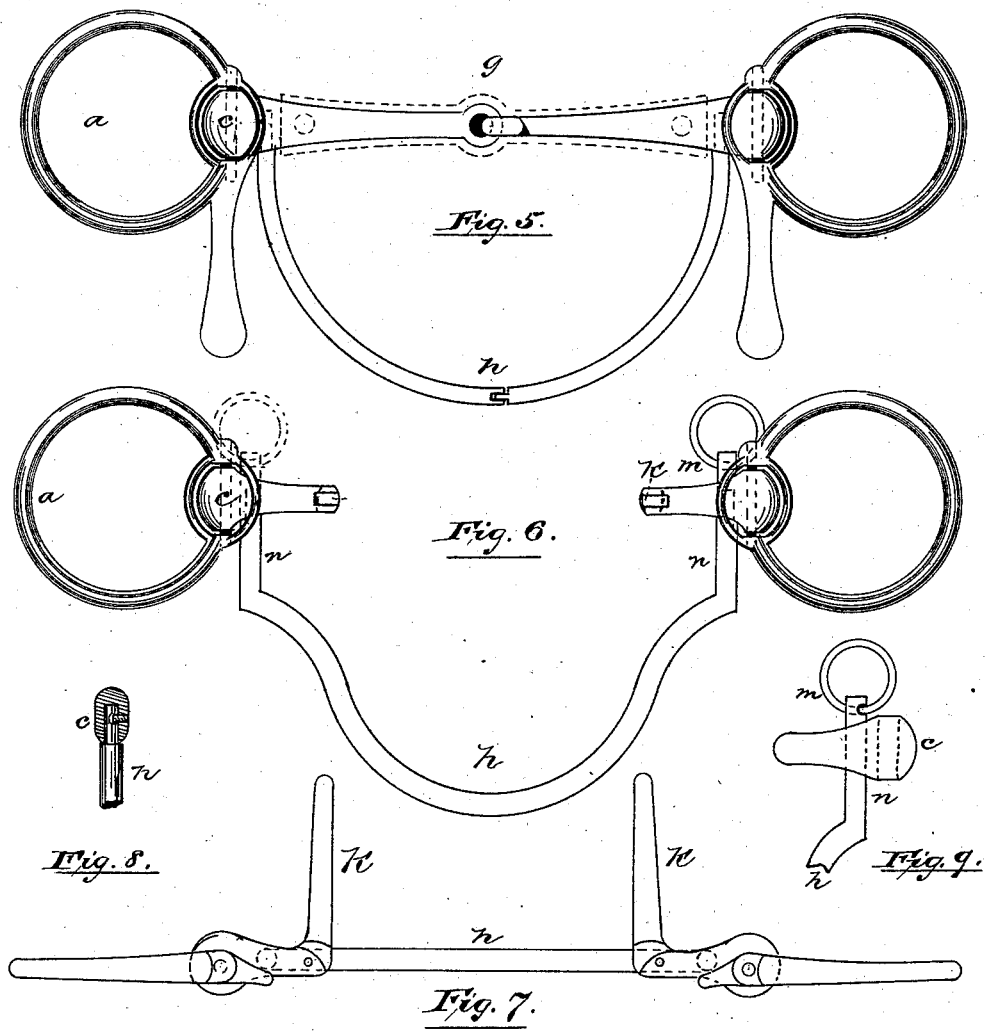

UNITED STATES PATENT OFFICE.

JAMES STANLEY, OF NEWARK, NEW JERSEY.

BRIDLE-BIT.

SPECIFICATION forming part of Letters Patent No. 317,034, dated May 5, 1885.

Application filed September 8, 1884. (No model.)

*To all whom it may concern:*

Be it known that I, JAMES STANLEY, a citizen of the United States, residing at Newark, in the county of Essex and State of New Jersey, have invented certain new and useful Improvements in Bridle-Bits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention consists in the arrangements and combinations of parts substantially as will be hereinafter set forth, and finally embodied in the clauses of the claim.

Figure 1:
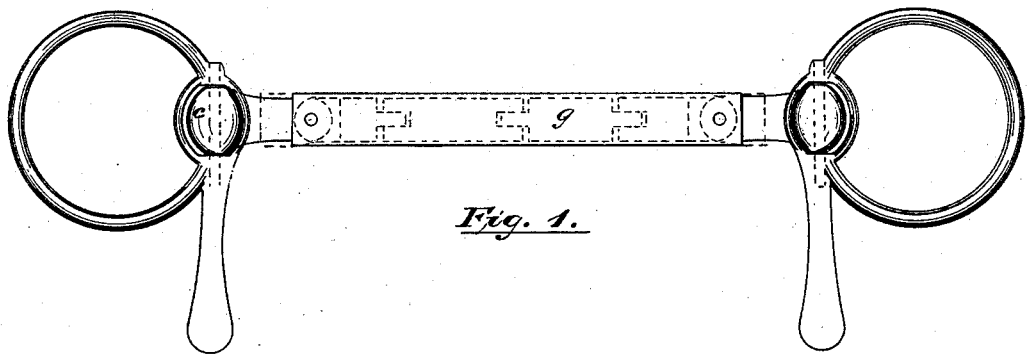
Figure 2:
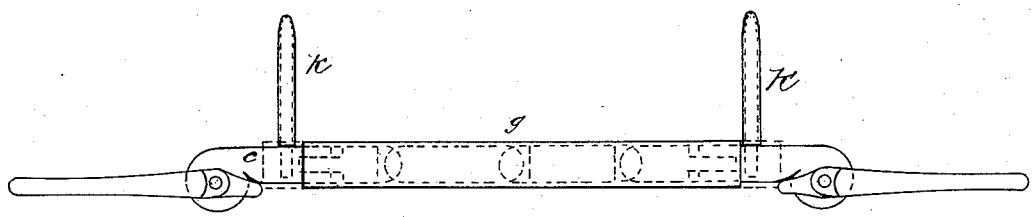
Figure 3:
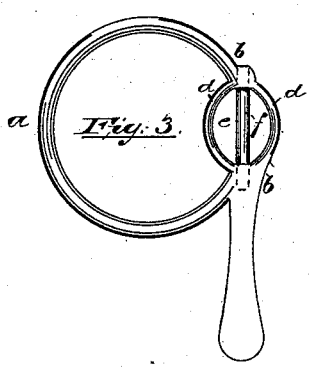
Figure 4:
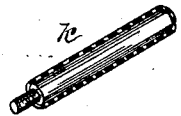

Referring to the accompanying drawings, embodied in two sheets, in which like letters refer to corresponding parts in each of the several figures, Figure 1 is an elevation, and Fig. 2 a plan, of a bit embodying certain features of the invention. Figs. 3 and 4 are views illustrating in detail a cheek-piece and a covered or cushioned mouth-projection adapted to enter between the horse's cheek and teeth or jaw and press against the latter when the rein is drawn. Figs. 5 and 6 are elevations of bits, showing certain preferred forms thereof. Fig. 7 is a plan of the device illustrated in elevation in Fig. 6; and Figs. 8 and 9 are details showing more clearly modes of connecting the throat-piece to the cheek-piece heads.

In carrying out the invention I form cheek-pieces $a\ a$, having the ring-jaws $b\ b$, between which the head $c$ is secured, connected by curved bars $d\ d$, which lie as close to said head as is consistent with the allowance of a free motion to said head. The said curved bars thus passing or extending from one jaw to the other in as direct a line as possible prevent the jaws from spreading when the rein is drawn.

I am aware that in a prior patent, No. 201,566, of March 19, 1878, I show jaw-connecting bars; but in this case said bars do not pass directly from jaw to jaw, but extend back from the jaw and then over so as to form rein-rings. Such a construction I do not, of course, wish to be understood as claiming. Through the middle of the eye $e$, formed by said curved bars $d\ d$, and in which the said head $c$ works, and extending from jaw to jaw, is secured or formed a pivotal pin, $f$, to receive the head $c$ and allow a pivotal movement thereof. The cheek-pieces $a\ a$ are connected by an ordinary mouth-piece, $g$, as in Figs. 1 and 2, or by a throat-piece, $h$, Figs. 6 and 7, which passes on the under side of the lower jaw of the horse, or by both a mouth-piece and throat-piece, as in Fig. 5. Upon said mouth-piece $g$ or the head $c$ is secured a mouth projection, $k$, which lies at an angle to the position usually occupied by the ordinary mouth-piece, so as to pass between the horse's cheek and his jaw. By drawing the rein, the mouth-piece or the throat-piece having a pivotal relation to said projection so as to allow such action, the said mouth projections $k$ are brought together or toward one another against the horse's jaw, clamping the same, so that said horse will be brought under perfect control. When the projections $k$ are used with the throat-piece $h$, the former are pivoted at or nearly at the ends of the said throat-piece to allow the independent pivotal movement above referred to.

The mouth projection $k$ may be and preferably is adjustable in its relation to the head $c$. For example, in Fig. 2 it is shown to be entirely removable from said head to enable the bit to be used without it when such is desired, the said head being bored out and the projection provided with a screw, as in Fig. 4, to allow the latter to be removed and be readily readjusted; or, as in Figs. 6 and 7, where the said projection $k$ is shown to be pivoted on the heads and capable of being turned down and thus converted into a section of an ordinary mouth-piece. Of the two methods of adjusting the said projection I prefer the one in which the same is entirely removable. The throat-piece $h$ may be rigid, as in Fig. 6, or jointed, as in Fig. 5.

To provide a check for the horse, I may, as in Fig. 6, allow the throat-piece $h$ to pass entirely through the head $c$ and project therefrom on the opposite side, and there be provided with a ring or eye, $m$, to receive the check-rein or overdraw directly or indirectly. In this case should the throat-piece be of metal the head c may slide on the straight portion n to allow for a certain amount of motion to the horse's head.

In lieu of the metallic throat-piece I may simply perforate the head at a point back of the perforation for the pivotal pin f, and insert a leather or rawhide cord therein with a ring or loop at the ends, or I may perforate the bit and allow the purchaser to insert said cord.

The perforated heads c may be simply the ends of a rigid or jointed mouth-piece, as in Fig. 5, or may be heads for the mouth projection.

Having thus described the invention, what I claim as new is—

1. In a bit, the cheek-piece a, provided with jaws b b, directly connected by curved bars d, which form an eye for the reception of the head c and prevent said jaws from spreading.

2. In combination, the heads c, connected together, substantially as shown, cheek-pieces provided with bars d d, which connect said jaws directly and lie in close relation to said heads, and the pivotal pin f, all said parts being arranged and operating substantially as and for the purposes set forth.

3. In a bridle-bit, the combination of the head c, cheek-piece a, and projection k, adjustably arranged upon said head, substantially as and for the purposes set forth.

4. In combination with the heads c c and cheek-pieces a a, mouth projections k k, arranged at an angle to the line of the ordinary mouth-piece and removable from said heads, substantially as and for the purposes set forth and shown.

5. In combination in a bridle-bit, the throat-piece h, heads c, having a pivotal relation thereto, and provided with mouth projections k, cheek-pieces a, and the pin f, all said parts being arranged and operating substantially as and for the purposes set forth.

6. In a bit, the heads c, perforated to receive the pins f and throat-piece h, in combination with the cheek-pieces, pins f, and throat-piece, substantially as set forth.

7. In a bit, the heads c, throat-piece h, the ends of which are provided with an eye, and the cheek-pieces a, all said parts being arranged and combined substantially as set forth.

8. In a bridle-bit, in combination with the heads c and cheek-pieces a, the throat-piece h, having straight ends n with the heads sliding thereon to allow a play to the horse's head, substantially as set forth.

9. In combination with the head c and cheek-pieces a, connected by a mouth or throat pieces or pieces, the cushioned or covered mouth projections k, arranged and operating substantially as and for the purposes set forth and shown.

In testimony that I claim the foregoing I have hereunto set my hand this 30th day of September, 1884.

JAMES STANLEY.

Witnesses:
CHARLES H. PELL,
F. F. CAMPBELL.